United States Patent [19]

Waters et al.

[11] Patent Number: 4,709,973
[45] Date of Patent: Dec. 1, 1987

[54] INSERT RETENTION MEMBERS FOR CONNECTORS

[75] Inventors: Mark H. Waters, Harrisburg; Robert N. Whiteman, Jr., Middletown, both of Pa.

[73] Assignee: AMP Incorporated, Harrisburg, Pa.

[21] Appl. No.: 876,569

[22] Filed: Jun. 20, 1986

[51] Int. Cl.$^4$ .................... H05K 1/00; F16B 13/06
[52] U.S. Cl. .................................. 439/78; 411/71; 439/82
[58] Field of Search ............. 339/17 LC, 92 R, 92 M; 411/179, 180, 181, 71, 72, 73, 177, 176, 188, 44

[56] References Cited

U.S. PATENT DOCUMENTS

| | | | |
|---|---|---|---|
| D. 262,863 | 2/1982 | Barnsdale | 411/181 X |
| 2,949,142 | 8/1960 | Sumerak | 411/180 |
| 3,244,801 | 4/1966 | Dozier | 411/44 |
| 3,461,936 | 8/1969 | Rosan et al. | 411/181 |
| 4,371,300 | 2/1983 | Ringham | 411/71 X |

FOREIGN PATENT DOCUMENTS

| | | | |
|---|---|---|---|
| 1351330 | 12/1963 | France | 339/17 LC |
| 2307167 | 11/1976 | France | 411/71 |
| 2088986 | 6/1982 | United Kingdom | 411/71 |

*Primary Examiner*—William R. Briggs
*Attorney, Agent, or Firm*—David L. Smith

[57] ABSTRACT

An insert retention device for retention of same in a dielectric housing serving as a screwlock especially suitable for high speed connector assemblies; these insert retention devices are desirable because of their characteristics when cold pressed into a plastic housing and are useful for electronic printed circuit board assembly and the like.

10 Claims, 7 Drawing Figures

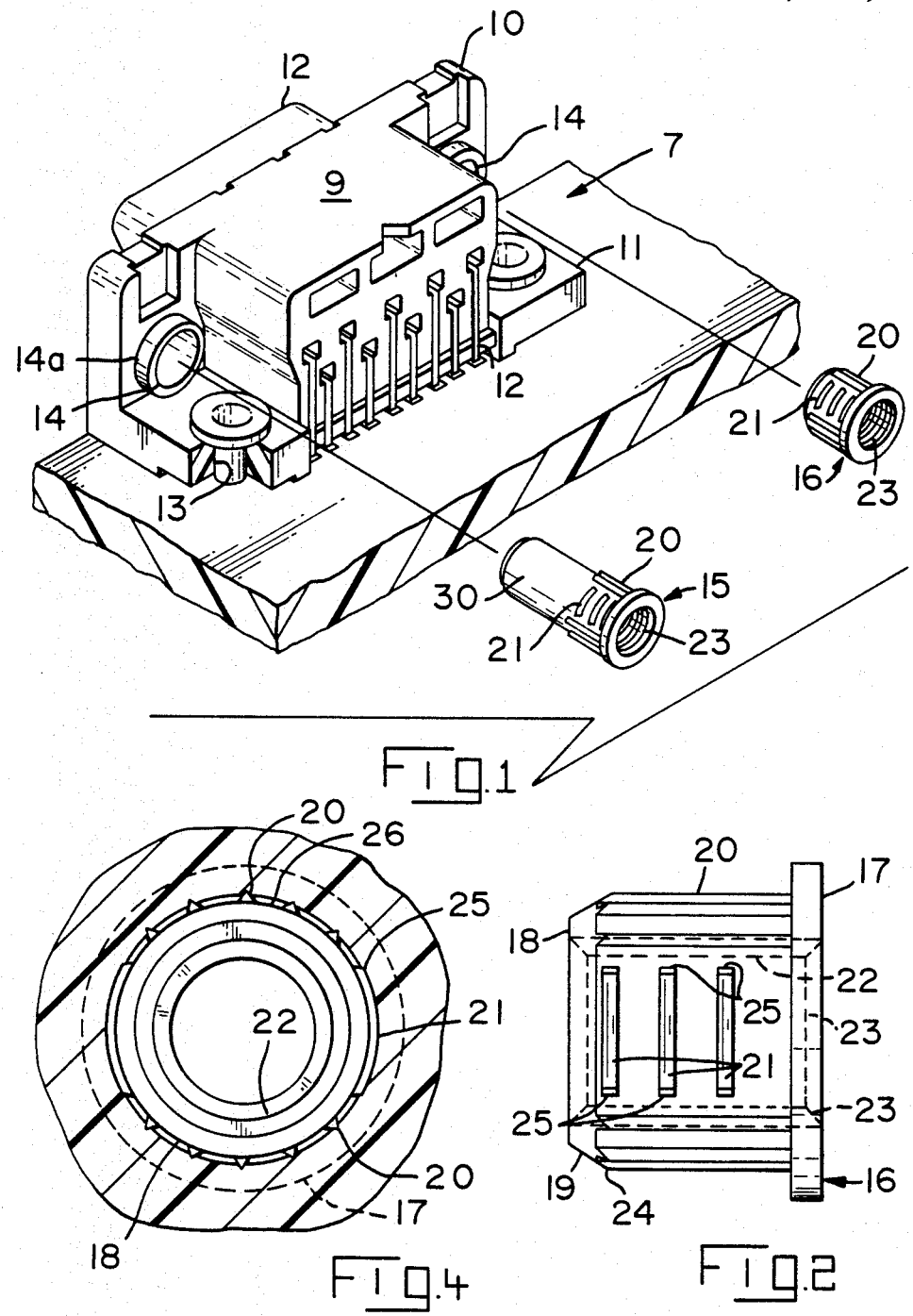

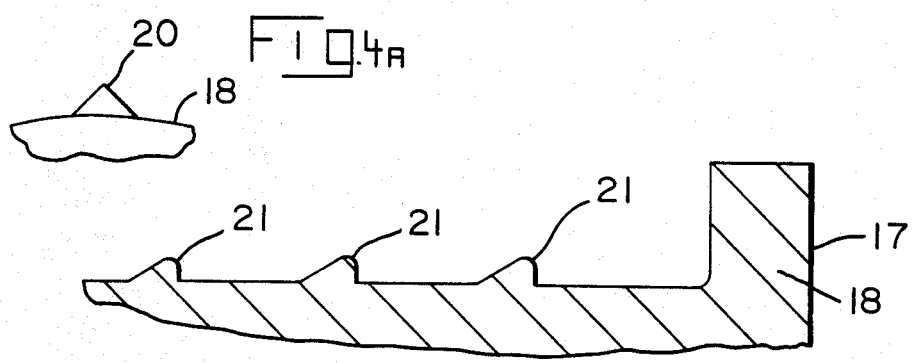
Fig. 4A
Fig. 3
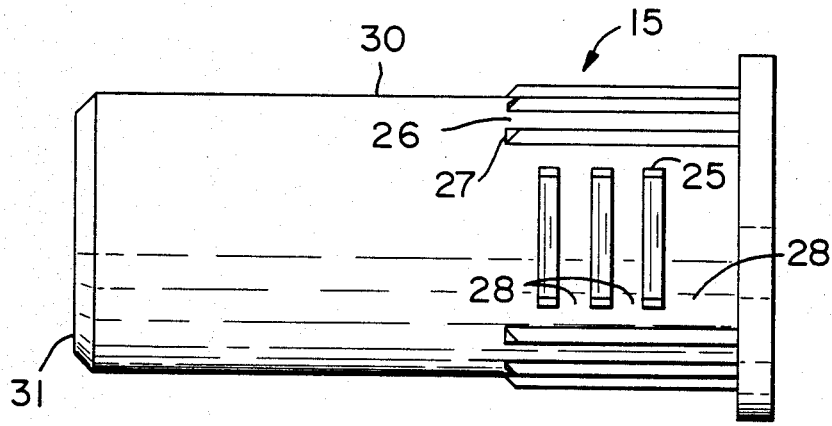
Fig. 5
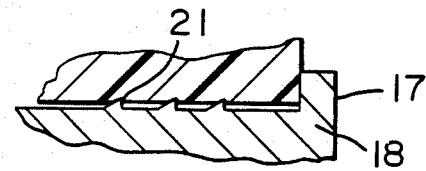
Fig. 6

INSERT RETENTION MEMBERS FOR CONNECTORS

This invention relates to insert retention members such as used for dielectric housings preferably for use in conjunction with electrical connectors. More particularly, this invention relates to threaded insert retention members and rear load female screwlocks. Still further, this invention relates to insert retention members that are cold pressed into thin walls of a dielectric housing without destruction of the walls or splitting of the housing, yet obtaining insert retention members having very good torque and pushout characteristics and thus outstanding retention ability once pressed in the housing such as a D-connector and the like.

BRIEF DESCRIPTION OF THE PRIOR ART

Various devices have been proposed for retaining a threaded insert and the like in a dielectric or metal housing.

U.S. Pat. No. 4,143,579 shows a two-part frangible insert which is broken and thus one part forced over the other. The disclosed insert has been suggested for insertion in a cavity in a workpiece. Both parts of the device contain splines which supposedly force the engagement of one into the other, the splines of each part being inclined differently from that of the other part.

As it can well be appreciated, the combination requires a frangible separation and a fairly complex spline arrangement on the periphery of the two devices, complicating not only the fabrication, but also the availability of materials suitable for forming in the shape which would frangibly co-act in a hole. Moreover, the device is not suitable for holes in thin walls. Hence, the complication introduced by the insert device is unduly expensive, and the two step operation is economically not as feasible for a high speed operation, especially for thin wall insertions.

In U.S. Pat. No. 3,498,353, a press insert has been disclosed which has an appropriately shaped pilot diameter and a plurality of barbs along the outer peripheral transversely to the longitudinal axis of the device. A separate section, larger in diameter than the barbed section, has been provided. This section has a longitudinal knurled portion, and this portion then engages at very shallow depths the material in which the insert has been inserted.

However, the depth of the knurled portion does not cooperate in a sufficiently beneficial manner with the barbs. The number of longitudinal ribs is excessive, and the insert thus does not function desirably as the barbs and the knurled portion tend to break the material at the surface thereof due to the compressive force being exerted by the larger diameter knurled portion vis-a-vis the smaller hole which has been used to drill for the barbed portion. Thus, this device again may not be used for thin wall applications.

Still further, U.S. Pat. No. 3,530,921 illustrates a tapered insert device useful for securing a screwlock and the like in a dielectric material.

Although the flanges around the circumference of the shank of the insert device are supposed to give torque resistance as well as removal resistance, the tapering of the device, as well as the body shape of the flanges, has shown a number of shortcomings. Primarily these shortcomings are associated with the insert being not sufficiently retentive due to the taper as well as the riblike structure, or as identified in the patent, "flat elliptical like surfaces". The riblike structures have also been unduly numerous and entry resistant, thereby preventing easy insertion and applications where thin walls are encountered.

Hence, there has been a need for securing electronic devices together and the like of the type as will be further discussed herein, i.e., with fairly thin walls. The securing with prior art devices has been without great assurance and reliability. The present devices, however, provide for easy insertion by comparison with prior art devices, and easy and highly reliable insertion based on the co-action between an insert member and the dielectric housing.

SUMMARY OF THE INVENTION

In accordance with the present invention, insert retention members for cold press insertion into apertures of a connector housing comprise a shank having parallel longitudinally-extending ribs at spaced locations on an external surface thereof and parallel transversely-extending barbs at spaced locations also on the external surface. The ribs and barbs cooperate with the housing material to retain the insert retention members in the apertures and not be susceptible to torque forces.

BRIEF DESCRIPTION OF THE DRAWINGS

With reference to the drawings herein, these disclose various embodiments of the novel device by way of example as well as the use thereof and wherein:

FIG. 1 shows in an orthogonal rear view, partly in section, of a D-connector mounted on a circuit board with the novel insert retention devices exploded therefrom;

FIG. 2 is a side elevational view of one of the insert-retention members;

FIG. 3 is a part cross section of the member shown in side view in FIG. 2;

FIG. 4 shows a front elevational view of the member shown in FIG. 2;

FIG. 4a shows a detail of FIG. 4 with reference to a longitudinal retention means;

FIG. 5 illustrates a side elevational view of an embodiment of the insert retention member; and FIG. 6 is a part cross section of the member of FIG. 5.

DETAILED DESCRIPTION OF THE INVENTION

Turning now to FIG. 1, a D-type connector 7, well known in the art and available such as from AMP Incorporated of Harrisburg, Pa., trademarked as AMPLIMITE Connectors, is shown. It has a housing 9 which includes a perpendicularly upright section 10 and mounting portions 11. D-type connector has a D-shaped section 12 at the front of section 10.

Each mounting portion 11 of housing 9 has an aperture 13 therein. These are used for mounting the D-type connector on printed circuit board 40 and the like. A metal shield 12 is mounted on D-shaped section 12 and has the same configuration as well as a planar section that extends along upright section 10. Ground straps 12b are located in recesses 11a of mounting portions 11 and they include sections (not shown) that extend along channels in the bottom of mounting portions 11 as part of metal shield 12a. Terminating sections 12 of electrical terminals (not shown) in housing 9 extend along the rear surface of housing 9 and are electrically connected with conductive areas on circuit board 40.

The upright section 10 of housing 9 carries two apertures identified as 14, and into these are inserted appropriate insert retention members for electrically joining the D-type connector 7 to a female plug therefor (not shown), or a back panel of a computer housing.

Typically the plug is secured such as by means of a bolt with a nut thereon, and various locking arrangements are used to prevent the removal of the bolt from the D-type connector housing 9.

Apertures 13 and 14, however, are used not only for ultrasonic welding of an insertion device, heat stake implantation of insertion devices, or fastening of a threaded sleeve, but also for a nut and bolt to secure the D-type connector to a printed circuit board. However, apertures 14 may be used to employ the novel insert retention members with far better results, as will be further discussed herein.

The novel insert retention members 15 and 16, as illustrated herein, are typically inserted from the rear of housing 9 and, as assembled, provide very convenient means for further assembly, such as by robotics and the like. Rapid part assembly of the D-type connector 7 with the insert retention members 15 or 16 being in place is achieved, and ready as final assembled parts for precise placement of the connector 7 onto a circuit board are now made more rapidly.

Thus with reference to FIG. 1, insert retention members 15, 16 are shown with insert retention member 16 being further illustrated in FIGS. 2 to 4a.

With reference to FIG. 2, the rear-loaded, internally-threaded insert retention 16 is designated as such because of the manner in which the loading takes place in connector 7. Insert retention member 16 contains a flange 17, which is larger in diameter than shank 18 of the insert retention member. Shank 18 has a threaded aperture 22 with a chamferred section 23 at each end thereof. Moreover, and more importantly, shank 18 has circumferentially and longitudinally to the axis of member 16, a plurality of longitudinally circumferentially spaced apart retention means identified as ribs 20; these are axially parallel along an external surface of shank 18. As shown in FIG. 4, two segments or sections of the longitudinal ribs 20 have been provided opposite to each other around the outer surface of shank 18 interrupted by a plurality of transversely oriented, spaced barbs 21, again in two opposed sections. These barbs 21 are shown in FIGS. 2, 3 and 4. Ribs 20 and barbs 21 extend radially outward from the surface of shank 18 and provide an interference fit with the surface of aperture 14 that both retains insert 15 or 16 in aperture 14 and prevents the insert from rotating in aperture 14.

As shown in FIG. 3 which is a part cross section of FIG. 2, barbs 21 extend partially circumferentially along shank 18 and are spaced apart one from each other. Ends 25 of barbs 21, as shown in FIGS. 2 and 4, have a chamber which has the function of facilitating the entry of the insert device in the material with minimum damage. The height of barbs 21 varies from the outermost to innermost, however, they can be of the same height, if desired.

It is noted that the circumferential location of each of longitudinal ribs 20 is about 22 degrees and 30 minutes for five longitudinal ribs 20 on one side. Although this has been shown as an illustration, fewer or more ribs 20 may likewise be inserted, but it has been found that this orientation and separation seems to be most beneficial.

Thus, the separation distance 26 has been established as between longitudinal retention ribs 20, as well as for retention barbs 21. Ribs 20 are preferably equidistant. For barbs 21, the distance may be uniform or may be also slightly varied as desired.

Still further, the typical barb orientation, as shown in FIG. 3, is about 30 degrees inclined with respect to shank 18, with the incline being rearwardly or to the right as shown in FIG. 3, thereby providing positive retention. Greater or lesser angles may be used.

Turning now to FIG. 2, threaded aperture 22 has a chamferred entry section 23 for the bolt when seeking the aperture 22, thereby aiding the centering and entering of the bolt (not shown) from the matable electrical connector.

As shown in FIG. 2, rear loaded, insert retention member 16 may be used in aperture 13 as well as 14. As the thickness of the walls no longer limits the application of member 16, the increased flexibility for use is well appreciated. Accordingly, a bolt may then be used for either top threading or bottom threading and attachment to a back panel or to a circuit board in, e.g., a computer.

Because shank 18 has at its front surface a chamferred section 19, shown in FIG. 2, longitudinal ribs 20 likewise have a chamferred section 27 at their leading ends which has further been illustrated in FIG. 5. Sections 27 aid shank 18 to be inserted into apertures 13 or 14 and minimize the entry damage in the material surrounding apertures 13 or 14.

The spatial relationship of ribs 20 and barbs 21 around the circumference of shank 18 as been clearly shown in FIG. 4. The detail of longitudinal ribs 20 and their typical angular relationship of the apex of the rib to the base of the rib has been shown in FIG. 4a as a detail of FIG. 4. An apex angle of 45 degrees has been found best, but lesser or greater angles may be employed, e.g., about plus or minus 10 degrees.

Similarly, the separation distance of transversely oriented retention barbs 21 has been illustrated in FIG. 5 as 28. This separation distance may be increased or decreased. Likewise barbs 21 may be increased or decreased. It has been found to be most useful if there is a sufficient separation distance 28 between each of barbs 21. Thus, based on a shank diameter and the hardness of the material of housing 9 and the like, it has been found that these are typically spaced apart from about 1/5 to about ⅓ of the shank diameter, although greater and lesser spacing may be observed.

As shown in FIGS. 2 to 4a, the interaction is especially beneficial because longitudinal ribs 20 are spaced apart from each other, as well as from barbs 21, thus providing good retention ability without diminishing the strength of the surrounding material upon insertion. When barbs 21 are closely spaced to each other and when ribs 20 are likewise close to each other, great damage may be done to thin walled housings. By thin walled housings it is meant where the housing wall at any point is less than half the diameter of insert retention members 15 or 16.

The spaced apart relationship as shown by spacings 26 and 28 assure the desirable retention which is further enhanced by the fact that, upon torquing, the material of the housing is of sufficient integrity between each of the longitudinal ribs 20, as well as the barbs 21, that damage is not done. This spaced apart relationship of the type as illustrated is especially desirable in cold press insertion, i.e., when members 15 and 16 are cold pressed into apertures 13 or 14 of housing 9. The result is good torque resistance as well as good pushout resistance provided by ribs 20 and barbs, respectively, cooperating, however, with the housing material surrounding the same to such a degree that no weakening of the surrounding material occurs as has been experienced with prior art devices.

Turning now to FIG. 5, the embodiment of insert retention member 15 is distinction from the embodiment shown in FIG. 2, insert retention member 15 (also called rear-loaded female screwlock) is inserted in the D-connector housing as shown in FIG. 1 in such a manner that it penetrates through the vertical portion 10 of housing 9, i.e., through aperture 14, and projects forwardly through the female plug (not shown), or through a corresponding aperture in back of a computer back wall (which also may be a ground plate).

Extended portion 30 of shank 18 in FIG. 5 thus serves to accommodate different thicknesses of the vertical portion 10, as well as to accommodate added shielding thickness such as for shielded D-type. connectors, or even to establish a shielding contact or ground contact, as necessary.

Similarly, extended portion 30 serves to project forwardly from a panel at the rear of an electronic device, such as a computer, the entire D-connector assembly and allows the protruding extended portion 30 to be located and appropriately secured by a screw bolt and the like, and the female plug for the D-type connector thereafter fitted over the same.

Again, for emphasis it is stated that the relationship of longitudinal antitorque ribs 20 around the periphery of shank 18 cooperate with transversely oriented retention barbs 21 and thus secure in a housing insert retention members 15 or 16, e.g., the rear-loaded female screwlock device as illustrated in the drawings herein. The further advantage, of course, by the location of barbs 21 and longitudinal ribs 20, as illustrated herein , is achieved with the proper spacing and material location vis-a-vis the shank 18. In the industry, the housing thicknesses have been such that use of the prior art devices has not been acceptable, especially, that is, the insert retention members being cold pressed into the housing, because the wall thicknesses have been so thin that the prior art devices have tended to crack the housings and destroy the thin walls. Contrariwise, the present invention allows use of very thin wall housings as shown in FIG. 1 by providing protrusions 14a that extend outwardly from an inner surface of section 10 through which apertures 14 extend thereby providing more material which enables the insert retention members to be cold press inserted into the apertures without splitting and thus weaken the entire housing. Cold pressing, as a process, has many advantages, especially speed; therefore, an insert retention member, which can be inserted by cold press insertion, is especially desirable.

Inasmuch as today's housings are often made of glass filled nylon, the forces which are exerted by the cold press insert retention members are fairly sizable and would have caused destruction or damage of the parts were it not for the insert retention members as disclosed herein.

The materials which may be used for the present members 15 and 16 are brass or zinc, e.g., a zinc alloy marketed as Zamac 3, or any like materials having the necessary characteristics.

In discussing the connectors, a D-type connector has been exemplified; however, any connector which has a housing provided with thin walls, as defined above, may be usefully combined with the present insert retention members. As examples of such connectors, one can mention the various plug and socket connectors having screw joinable housings.

In accordance with the foregoing, insert retention members have been described for cold press insertion into apertures of electrical connector housings and they include a shank having along an outer surface thereof longitudinally-extending parallel ribs at spaced locations and transversely-extending parallel barbs at spaced locations. The ribs and barbs cooperating with the material of the connector housings after the insert retention members have been cold pressed into the apertures to retain the insert retention members therein and not be susceptible to torque forces.

Although the above invention has been described with reference to the embodiments discussed above, various other alternatives and equivalents are within the scope of this invention as further defined herein with reference to the claims.

What is claimed herein:

1. A retention member for a dielectric housing such as an insert retention member, comprising:
    a flange;
    a shank interconnected with said flange;
    an aperture in said shank and said flange for securing a screw device and the like within the same, said shank further including a plurality of longitudinal antitorque retention means, each of said longitudinal antitorque retention means extending along an outer surface of said shank, upstanding therefrom and being spaced apart from its adjacent longitudinal antitorque retention means in at least one segment peripheral to said outer surface of said shank; and
    a plurality of transverse retention means extending along said outer surface of said shank and upstanding therefrom, said transverse retention means being spaced apart from each other and spaced from adjacent said longitudinal antitorque retention means within said at least one segment of said shank.

2. The retention member as defined in claim 1, wherein the shank has two oppositely spaced apart segments of transverse retention means with a plurality of transverse retention means in each of said segments.

3. The retention member as disclosed in claim 1, wherein each of the longitudinal antitorque retention means has a chamferred entry section on one end thereof with another end abutting said flange.

4. The retention member as defined in claim 1, wherein each of said longitudinal antitorque retention means are equidistantly spaced apart from each other and occupy at least two segments circumferentially around the periphery of said shank and are interrupted by two segments of said transverse retention means circumferentially around the periphery of said shank and wherein the transverse retention means are spaced apart from said longitudinal antitorque retention means.

5. The retention member as defined in claim 1, wherein said shank contains an extension portion thereof.

6. The combination as defined in claim 1 wherein the dielectric housing is a D-type connector.

7. The combination as defined in claim 4 wherein the dielectric housing is a D-type connector.

8. An electrical connector assembly, comprising:
   a dielectric housing having an aperture therein, said aperture having a wall;
   an insert retention member secured in said aperture, said insert member comprising:
   a shank;
   longitudinally extending rib means extending along a first peripheral section of an external surface of said shank for preventing rotation of the insert in the aperture, said longitudinally extending rib means extending outwardly from said external shank surface and engaging the aperture wall in an interference fit; and
   transversely extending rib means extending along a second peripheral section of said external shank surface and spaced from said longitudinally extending rib means for preventing removal of the insert from the aperture, said transversely extending rib means extending outwardly from said external shank surface and engaging the aperture wall in an interference fit.

9. An electrical connector assembly as recited in claim 8, wherein said longitudinally extending rib means are located at opposed positions on said external shank surface.

10. An electrical connector assembly as recited in claim 8, wherein the transversely extending rib means are located at opposed positions on said external shank surface.

* * * * *